United States Patent
Kang et al.

(10) Patent No.: US 10,852,982 B2
(45) Date of Patent: Dec. 1, 2020

(54) METHOD, SYSTEM, AND COMPUTER PROGRAM PRODUCT FOR MANAGING STORAGE SYSTEM

(71) Applicant: EMC IP Holding Company LLC, Hopkinton, MA (US)

(72) Inventors: Jamin Kang, Beijing (CN); Geng Han, Beijing (CN); Jibing Dong, Beijing (CN); Ree Sun, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 16/170,236

(22) Filed: Oct. 25, 2018

(65) Prior Publication Data

US 2019/0129646 A1 May 2, 2019

(30) Foreign Application Priority Data

Oct. 27, 2017 (CN) .......................... 2017 1 1023287

(51) Int. Cl.
*G06F 3/06* (2006.01)
*G06F 11/16* (2006.01)
*G06F 11/10* (2006.01)

(52) U.S. Cl.
CPC .......... *G06F 3/0647* (2013.01); *G06F 3/0604* (2013.01); *G06F 3/0619* (2013.01); *G06F 3/0644* (2013.01); *G06F 3/0676* (2013.01); *G06F 3/0689* (2013.01); *G06F 11/16* (2013.01); *G06F 3/0649* (2013.01); *G06F 11/1076* (2013.01)

(58) Field of Classification Search
CPC .... G06F 3/0647; G06F 3/0644; G06F 3/0689; G06F 11/1076; G06F 11/16; G06F 3/0649
See application file for complete search history.

(56) References Cited

U.S. PATENT DOCUMENTS

| | | | |
|---|---|---|---|
| 10,146,459 B1 | 12/2018 | Gao et al. | |
| 10,152,254 B1 | 12/2018 | Kang et al. | |
| 10,437,485 B2 | 10/2019 | Gao et al. | |
| 2013/0103978 A1* | 4/2013 | Akutsu | G06F 11/1076 714/6.23 |

(Continued)

FOREIGN PATENT DOCUMENTS

| | | |
|---|---|---|
| CN | 109726033 A | 5/2019 |
| CN | 110096217 A | 8/2019 |

*Primary Examiner* — Ernest Unelus
(74) *Attorney, Agent, or Firm* — BainwoodHuang

(57) ABSTRACT

Implementations of the present disclosure relate to a method, system and computer program product for managing a storage system. Specifically, in one implementation of the present disclosure there is provided a method for managing a storage system. The method comprises: dividing a source device among a plurality of storage devices in the storage system into a plurality of extents; copying data in the plurality of extents to a destination device; determining the state of an extent among the plurality of extents on the basis whether data in the extent among the plurality of extents has been copied to the destination device; and managing an access request to the extent on the basis of the state of the extent. In other implementations of the present disclosure, there is provided a corresponding system and computer program product.

18 Claims, 13 Drawing Sheets

(56) References Cited

U.S. PATENT DOCUMENTS

| | | |
|---|---|---|
| 2019/0220377 A1 | 7/2019 | Ma et al. |
| 2019/0332286 A1 | 10/2019 | Zhuo et al. |
| 2019/0332502 A1 | 10/2019 | Ma et al. |

* cited by examiner

METHOD, SYSTEM, AND COMPUTER PROGRAM PRODUCT FOR MANAGING STORAGE SYSTEM

RELATED APPLICATIONS

This application claim priority from Chinese Patent Application Number CN 201711023287.X, filed on Oct. 27, 2017 at the State Intellectual Property Office, China, titled "METHOD, SYSTEM AND COMPUTER PROGRAM PRODUCT FOR MANAGING STORAGE SYSTEM" the contents of which is herein incorporated by reference in its entirety.

FIELD

Various implementations of the present disclosure relate to storage management, and more specifically, to a method and system for managing a storage system (e.g. Redundant Array of Independent Disks (RAID)), as well as a computer program product.

BACKGROUND

With the development of data storage techniques, various data storage devices now provide users with higher data storage capacity, and also their data access speed has been increased greatly. With the increase of data storage capacity, users also impose greater demands on data reliability and response time of storage systems. So far various data storage systems based on redundant arrays of disks have been developed for improving reliability of data. When one or more storage devices (such as disks) in a storage system fail(s), data in failed disk(s) can be recovered from other normal disk.

The life of each storage device in RAID might be limited. For example, regarding a traditional hard disk drive (HDD), when input/output (I/O) fails frequently, it may be considered the service life of this HDD is about to end. For another example, regarding a solid state drive (SSD), when the validity period of the SSD is approaching, it may be considered the service life will end. Here the state where a storage device is about to break down and no longer suitable for use is called end of life (EOL). To prevent EOL of a storage device in RAID from reducing the reliability of RAID, when it is detected EOL might occur to a storage device (e.g. called source device), there is a need to perform proactive copy (PACO) to the source device so as to copy data in the source device to a backup storage device (e.g. called destination device) and replace the source device with the destination device.

Technical solutions for proactive copy between a source device and a destination device have been developed so far. However, the operation efficiency and security of existing technical solutions are far from satisfactory. At this point, how to perform proactive copy in a more effective and secure manner becomes a tough issue.

SUMMARY

Therefore, it is desirable to develop and implement a technical solution for managing a storage system more effectively and reliably. It is desired that the technical solution can be compatible with existing storage systems and manage data in existing storage systems more reliably by changing various configurations of these storage systems.

According to one implementation of the present disclosure, there is provided a method for managing a storage system. The method comprises: dividing a source device among a plurality of storage devices in the storage system into a plurality of extents; copying data in the plurality of extents to a destination device; determining the state of an extent among the plurality of extents on the basis whether data in the extent among the plurality of extents has been copied to the destination device; and managing an access request to the extent on the basis of the state of the extent.

According to one implementation of the present disclosure, there is provided a system for managing a storage system, comprising: one or more processors; a memory coupled to at least one processor of the one or more processors; computer program instructions stored in the memory which, when executed by the at least one processor, cause the system to execute a method for managing a storage system. The method comprises: dividing a source device among a plurality of storage devices in the storage system into a plurality of extents; copying data in the plurality of extents to a destination device; determining the state of an extent among the plurality of extents on the basis whether data in the extent among the plurality of extents has been copied to the destination device; and managing an access request to the extent on the basis of the state of the extent.

According to one implementation of the present disclosure, there is provided an apparatus for managing a storage system. The apparatus comprises: a dividing module configured to divide a source device among a plurality of storage devices in the storage system into a plurality of extents; a copying module configured to copy data in the plurality of extents to a destination device; a determining module configured to determine the state of an extent among the plurality of extents on the basis whether data in the extent among the plurality of extents has been copied to the destination device; and a managing module configured to manage an access request to the extent on the basis of the state of the extent.

According to one implementation of the present disclosure, there are provided computer program instructions which, when executed by at least one processor, cause the at least one processor to execute a method for managing a storage system as described above.

With the technical solution of the present disclosure, proactive copy may be performed more effectively and securely while I/O access to a storage system is not interrupted as far as possible.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings.

DETAILED DESCRIPTION

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
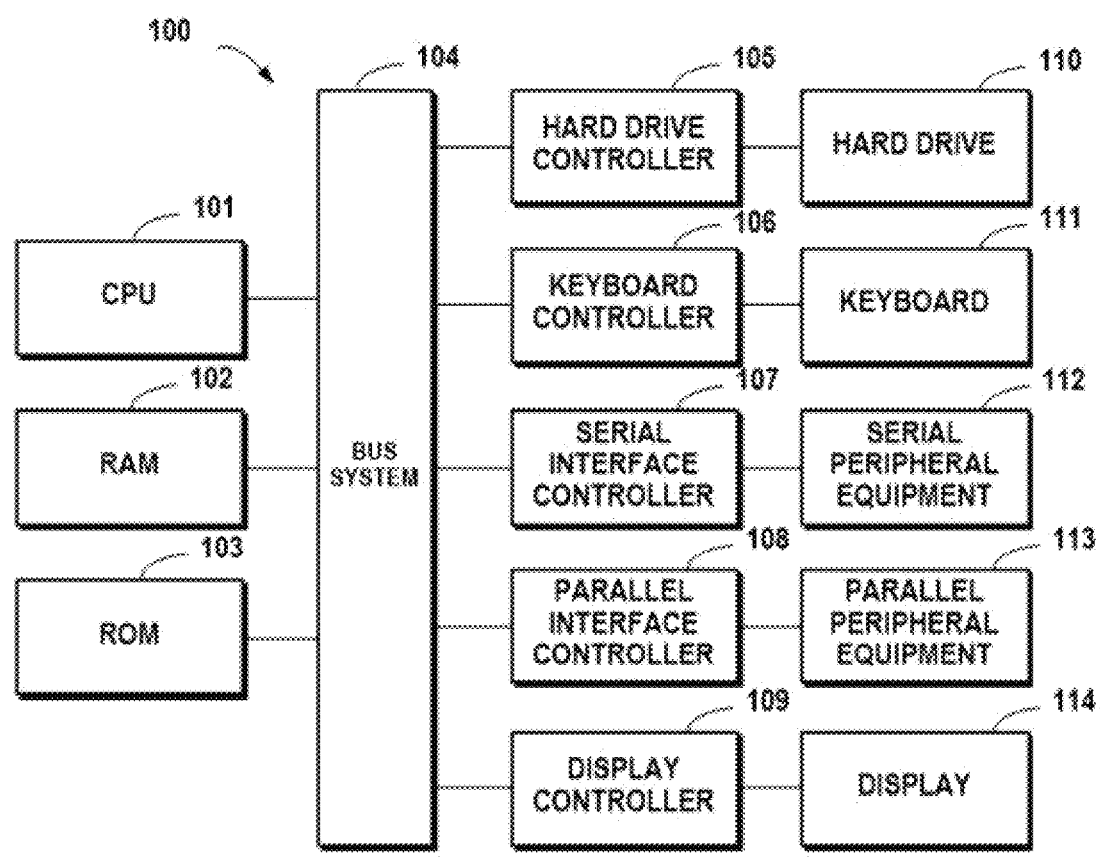
FIG. 1 schematically illustrates a block diagram of an exemplary computer system which is applicable to implement the implementations of the present disclosure.

FIG. 1 illustrates an exemplary computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In a storage system such as Redundant Array of Independent Disks (RAID), a plurality of storage devices (e.g. disks) may be combined into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 2A:
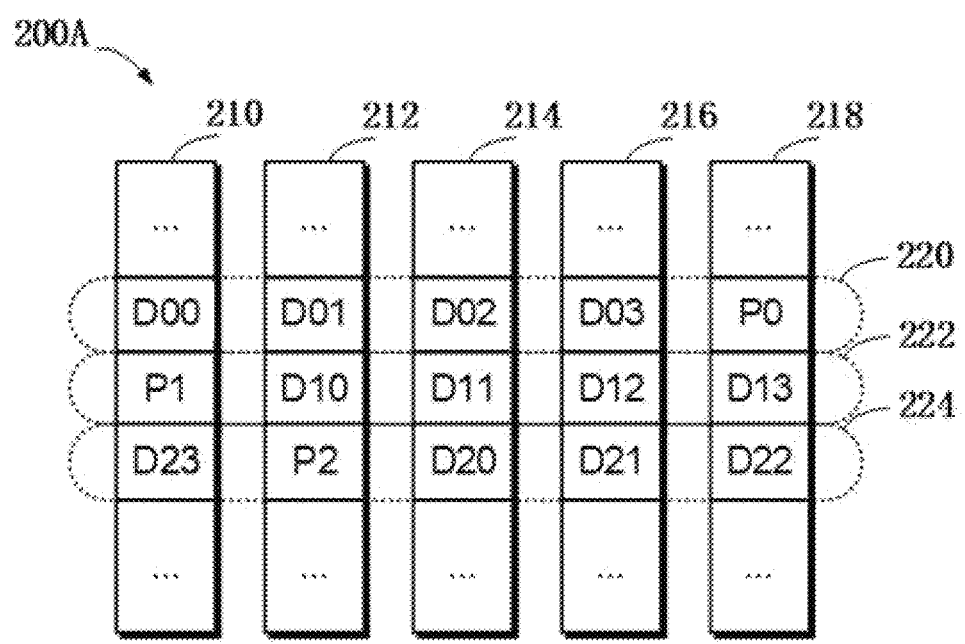
FIGS. 2A and 2B each schematically illustrates a block diagram of an application environment where the implementations of the present disclosure may be implemented.

FIG. 2A schematically illustrates a block diagram 200A of a structure of RAID according to one technical solution. In this figure, working principles of RAID are illustrated by taking RAID-5 (4D+1P, where 4D represents that 4 storage devices are included in the storage system for storing data, and 1P represents that 1 storage device is included in the storage system for storing parity) that consists of five independent storage devices (210, 212, 214, 216 and 218) as an example. It should be noted although five storage devices are schematically shown in FIG. 2A, in other implementations more or less storage devices may be comprised according to different versions of RAID. Moreover, although in FIG. 2A there are shown stripes 220, 222 and 224, in other examples the RAID system may further comprise different numbers of stripes.

In RAID, one stripe crosses a plurality of physical storage devices (for example, the stripe 220 crosses storage the devices 210, 212, 214, 216 and 218). The stripe may be simply construed as a storage area among a plurality of storage devices which satisfies a given address range. Data stored in the stripe 220 comprises a plurality of parts: a data block D00 stored in the storage device 210, a data block D01 stored in the storage device 212, a data block D02 stored in the storage device 214, a data block D03 stored in the storage device 216, and a data block P0 stored in the storage device 218. In this example, data blocks D00, D01, D02 and D03 are stored data, and data block P0 is a P parity of the stored data.

The mode of storing data in other stripes 222 and 224 is similar to that in the stripe 220, and the difference is that the parity about other data block may be stored in other storage device than the storage device 218. In this way, when one of the plurality of storage devices 210, 212, 214, 216 and 218 fails, data in the failing device may be recovered from other normal storage devices.

Figure 2B:
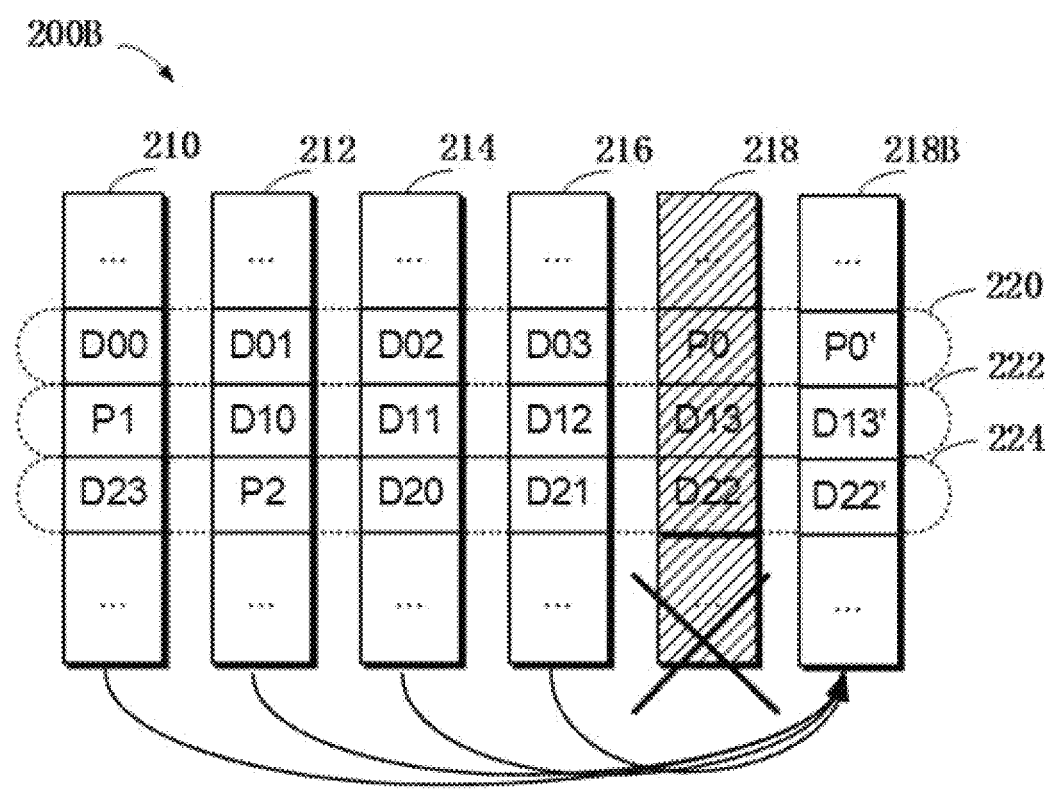

FIG. 2B schematically illustrates a schematic block diagram 220B of rebuilding process of RAID according to one technical solution. As shown in FIG. 2B, when one storage device (e.g. the storage device 218 shown in shades) fails, data may be recovered from the other storage devices 210, 212, 214 and 216 that operate normally. At this point, a new standby storage device 218B may be added into RAID to replace the storage device 218. In this way, recovered data may be written to 218B, and system rebuilding may be realized.

While a RAID-5 storage system comprising 5 storage devices (among which 4 storage devices are used for storing data and 1 storage device is used for storing parity) has been described with reference to FIGS. 2A and 2B, according to definition of other RAID levels, there may further exist a storage system comprising other number of storage devices. On the basis of definition of RAID 6, for example, two storage devices may be used to store parity P and Q respectively. For another example, according to definition of triple-parity RAID, three storage devices may be used to store parity P, Q and R respectively.

Figure 3A:
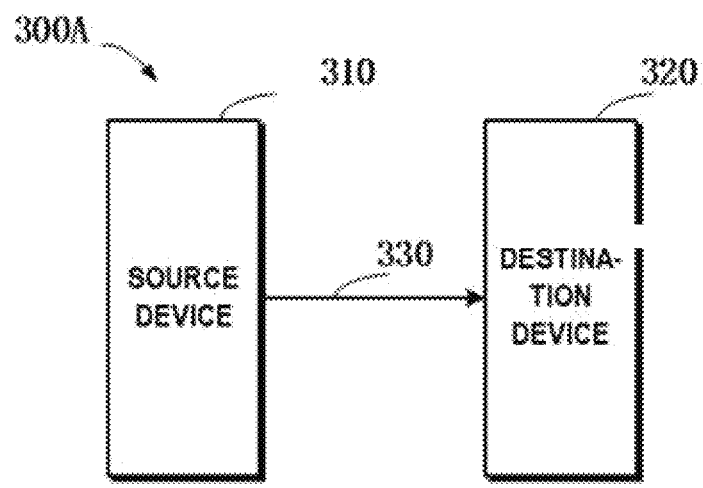
FIG. 3A schematically illustrates a block diagram of a technical solution for managing a storage system according to one technical solution.

FIG. 3A schematically shows a block diagram 300A of a technical solution for managing a storage system according to one technical solution. As depicted, suppose EOL will occur to one storage device 310 (referred to as source device 310 below) among a plurality of storage devices in the storage system, then at this point data in the source device 310 needs to be copied (as shown by an arrow 330) to another normal backup storage device 320 (referred to as destination device 320 below). Note the storage device 310 here may be any of the five storage devices 210, 212, 214, 216 and 218 shown in FIG. 2. The storage system at this moment is still in operating state, so the storage system still needs to receive user access from users during data copy.

Since a write access request from a user will change data in the storage system, according to existing technical solutions, the write access request has to be executed to the source device 310 and the destination device 320 separately. Note at this point the source device 310 is faced with EOL, and data writes will accelerate the corruption speed of the source device 310. On the one hand, when too many data write operations are performed to the source device 310, the device might immediately break down and cause potential risks to the storage system. On the other hand, since in existing technical solutions, copy is performed by taking the entire source device 310 as a unit, if the source device 310 breaks down or fails during copy, then it is difficult to fast determine which data in the source device 310 has been copied to the destination device 320, not to mention determine subsequent remedies.

Figure 3B:
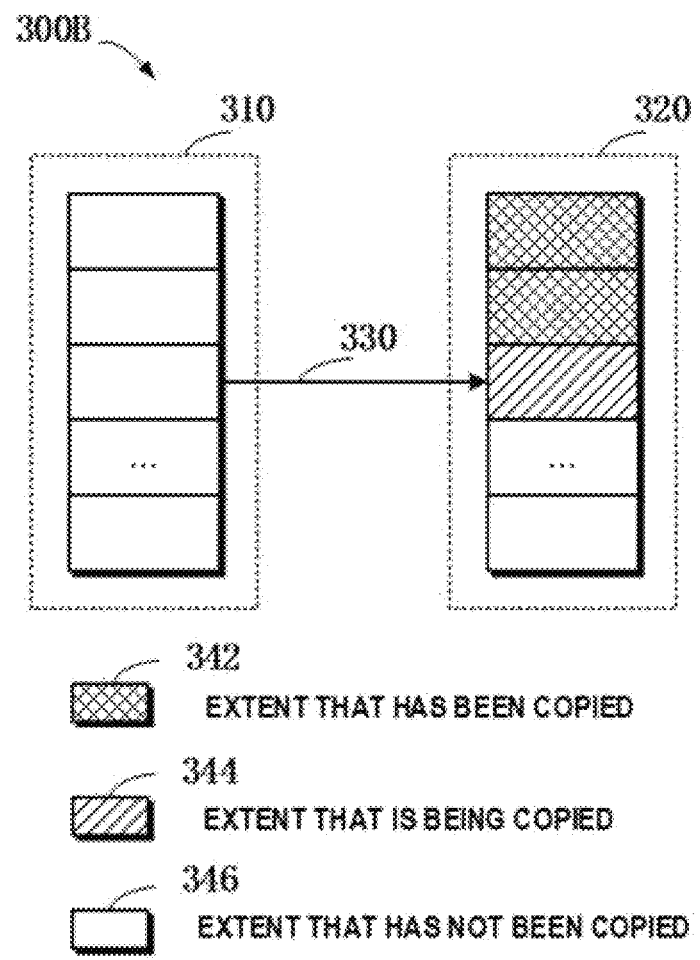
FIG. 3B schematically illustrates a block diagram of a technical solution for managing a storage system according to one implementation of the present disclosure.

In view of drawbacks in the foregoing technical solutions, the present disclosure proposes a technical solution for managing a storage system in a more effective and reliable manner. Specifically, FIG. 3B schematically shows a block diagram 300B of a technical solution for managing a storage system according to one implementation of the present disclosure. Instead of taking the entire source device 310 as a unit to perform proactive copy, in the implementation as shown in FIG. 3B, the source device 310 may be divided into a plurality of extents, and the extents are taken as a unit to perform proactive copy with finer granularity (as shown by an arrow 330). Specifically, a state may be set for each extent so as to indicate whether the extent has been copied from the source device 310 to a corresponding extent in the destination device 320. Specifically, a first extent in the source device 310 may be copied to a first extent in the destination device 320, a second extent in the source device 310 may be copied to a second extent in the destination device 320, and so on and so forth.

FIG. 3 schematically shows examples of three states, wherein the pattern shown by a legend 342 denotes "copied" state, i.e. representing the extent has been copied; the pattern shown by a legend 344 denotes "being copied" state, i.e. representing the extent is being copied; and the pattern shown by a legend 346 denotes "not copied" state, i.e. representing the extent has not been copied. Specifically, respective extents in the source device 310 may be sequentially copied one by one. As shown in FIG. 3B, it is clear from the foregoing legends that the states of extents in the destination device 320 may be denoted as copied, copied, being copied and not copied respectively.

In this implementation, since respective extents have different states, when receiving access requests to respective extents, how to execute a corresponding access request may be determined on the basis of the state of each extent. With reference to FIGS. 4 to 8, a detailed description is presented below to concrete details of each implementation of the present disclosure.

Figure 4:
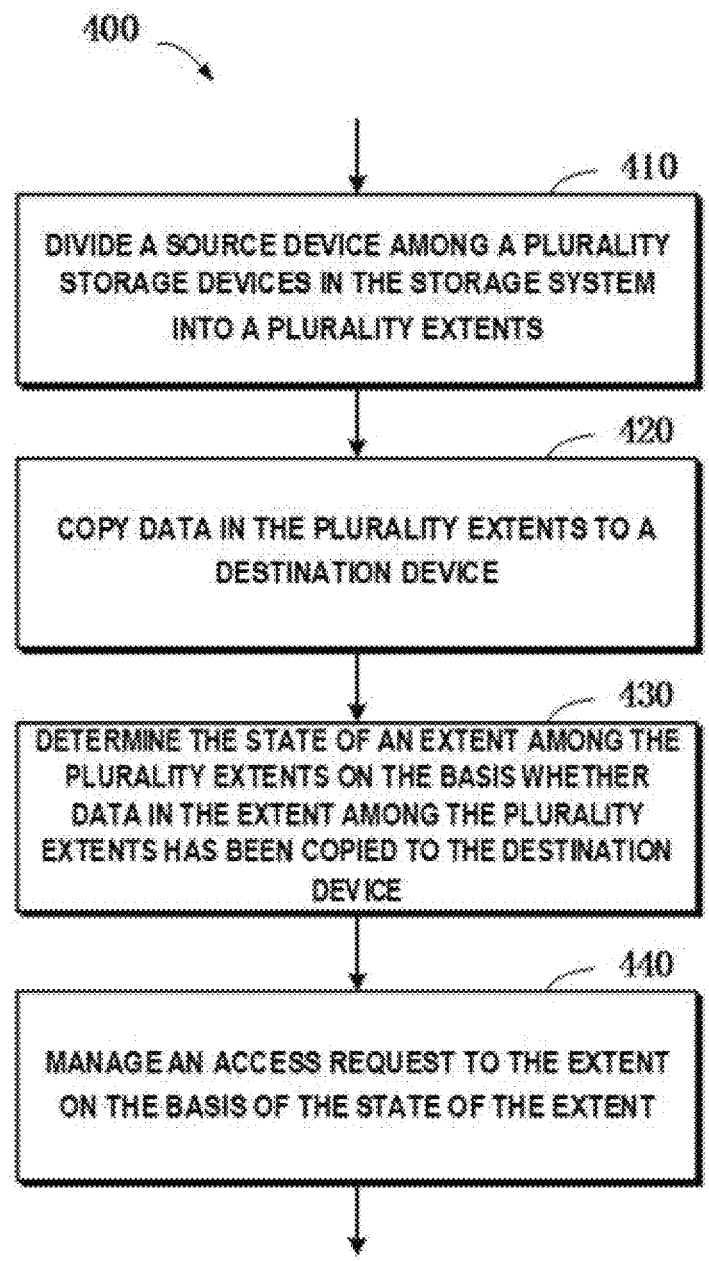
FIG. 4 schematically illustrates a flowchart of a method for managing a storage system according to one implementation of the present disclosure.

FIG. 4 schematically shows a flowchart of a method 400 for managing a storage system according to one implementation of the present disclosure. As depicted, disclosed is a method for managing a storage system. As shown in block 410, a source device among a plurality of storage devices comprised in the storage system is divided into a plurality of extents. In storage systems with different configurations, extents may have different sizes, and the size of an extent will affect resources and time involved in performing copy to the extent. The larger an extent, the more resources and time involved in copying the extent; the smaller an extent is, the less resources and time is involved. On the other hand, if extents are divided into too small granularity, although less resources and time will be involved in copying one extent, too many extents will lead to a large number of resources and time overheads for scheduling the copy. Therefore, a balance needs to be stricken between sizes of extents on the basis of overall configuration of the storage system. According to one implementation of the present disclosure, the extent size may be set to a magnitude order of several gigabits. According to one implementation of the present disclosure, the extent size may further set to other value.

As shown in block 420, data in the plurality of extents is copied to the destination device 320. At this point, extents may be copied to the destination device 320 by using each extent as a unit. According to one embodiment of the present disclosure, when copy of one extent is completed, copy of the next extent may start. In this manner, all extents may be copied from the source device 310 to the destination device 320 one after another.

As shown in block 430, during copying respective extents, the state of an extent among the plurality of extents may be determined on the basis whether data in an extent among the plurality of extents has been copied to the destination device 320. Here the state may comprise, for example: copied, representing data in the extent has been copied from the source device 310 to the destination device 320; being copied, representing data in the extent is being copied from the source device 310 to the destination device 320; and not copied, representing data in the extent has not been copied from the source device 310 to the destination device 320.

As shown in block 440, an access request to the extent is managed on the basis of the state of the extent (i.e. copied, being copied, not copied). It will be appreciated that during performing copy to the source device 310, since copy may be performed by using each extent as a unit, when an access request is received, it is not necessary to execute requested read and write operations to the entire source device 310 and the destination device 320. As an alternative, only when the received access request is a writing request and an extent involved in the writing request is being copied, a write operation is performed to a corresponding extent in the source device 310 and the destination device 320.

According to one implementation of the present disclosure, proactive copy may be performed with finer granularity (i.e. extent size). At this point, only when the writing request involves an extent that is being copied, a write operation is performed to a corresponding extent in the destination device 310 and the destination device 320. Therefore, the load of access of the source device 310 that used to be faced with end of life may be reduced greatly, and the breakdown risk of the source device 310 during proactive copy may be decreased as far as possible.

Figure 5:
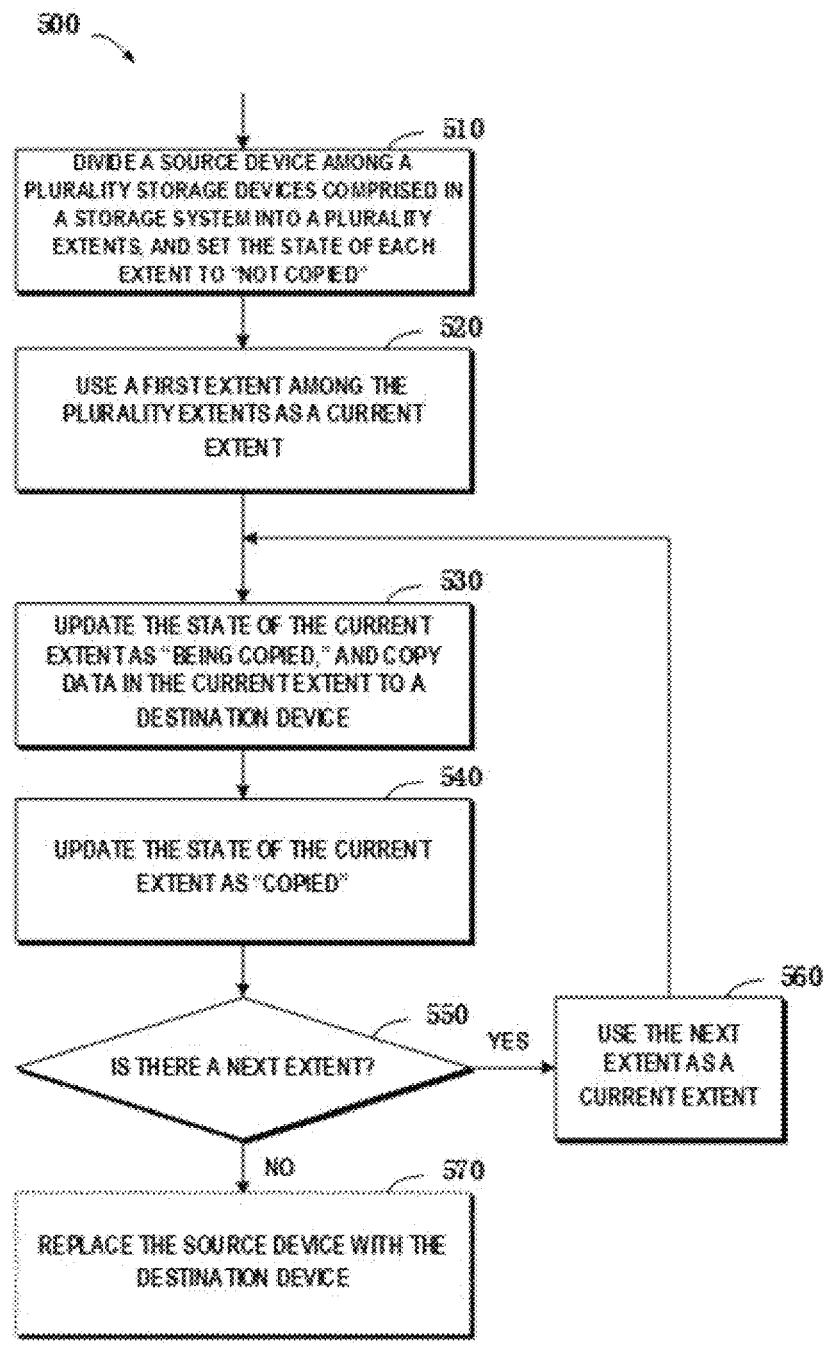
FIG. 5 schematically illustrates a flowchart of a method for performing copy to a plurality of extents in a source device according to one implementation of the present disclosure.

FIG. 5 schematically shows a flowchart of a method 500 for performing copy to a plurality of extents in a source device according to one implementation of the present disclosure. Specifically, in block 510, the source device 310 among a plurality of storage devices comprised in a storage system may be divided into a plurality of extents, and the initial state of each extent may be set to "not copied." According to one implementation of the present disclosure, the dividing may be implemented according to a predefined dividing rule. For example, a dividing rule may be to divide the source device 310 into 5G sized extents. For another example, a further dividing rule may be to divide the source device 310 into 10 extents. At this point, since the copy process does not start yet, the state of each extent may be set to "not copied."

In blocks 520 to 560, resultant extents may be copied from the source device 310 to the destination device 320 one after another. Specifically, in block 520, a first extent among the plurality of extents may act as a current extent. In block 530, the state of the current extent may be updated as "being coped," and data in the current extent may be copied from the source device 310 to a corresponding position in the destination device 320. After the copy is completed, the state of the current extent may be updated as "copied" in block 540. At this point, copy operation to one extent is completed, and in block 550 it may be judged whether there exists the next extent or not. If yes, the operation proceeds to block 560, and the next extent acts as a current extent. At this point, processing in blocks 530, 540 and 550 may repeated to the current extent, until processing to each extent among the plurality of extents is completed.

In block 550, if there does not exist the next extent, it means copy of each extent in the source device 310 has been completed. In block 570, proactive copy has been completed, and the source device 310 may be replaced with the destination device 320. It will be appreciated with the steps 510 to 560 in the method as shown in FIG. 5, all data in the source device 310 faced with end of life has been copied to the normal destination device 320, so the normal destination device 320 replaces the source device 310 in the storage system so as to maintain the normal operation of the storage system.

According to one implementation of the present disclosure, in response to the state indicating data in the extent has been copied to the destination device 320, the access request is directed to the destination device 320; in response to the state indicating data in the extent has not been copied to the destination device 320, the access request is directed to the source device 310; and in response to the state indicating data in the extent is being copied to the destination device, the type of the access request is determined; and the access request is managed on the basis of the type.

Figure 6:
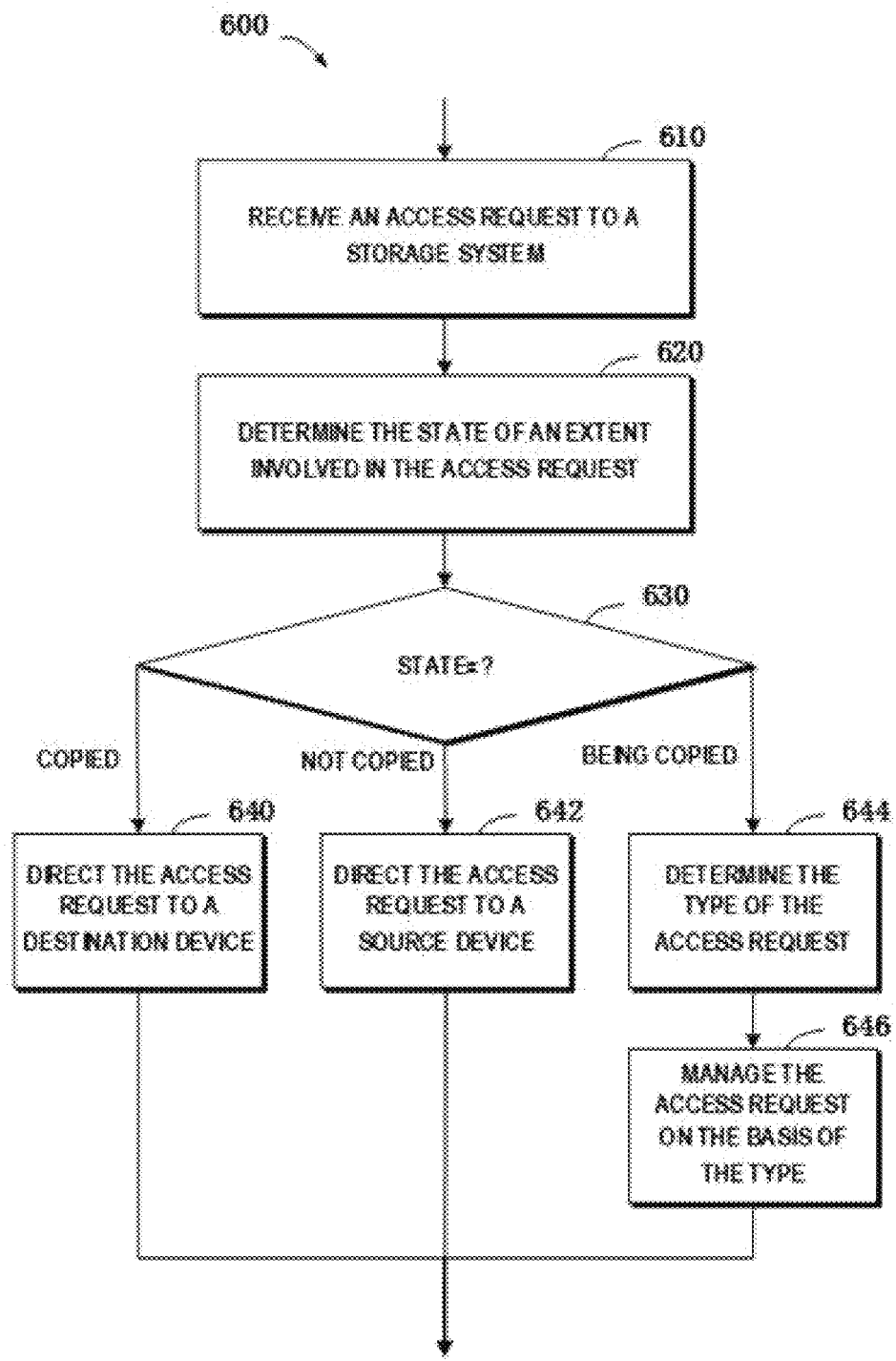
FIG. 6 schematically illustrates a flowchart of a method for managing an access request to an extent on the basis of the state of the extent according to one implementation of the present disclosure.

While how to modify the state of each extent during copy has been described with reference to FIG. 5, description is presented with reference to FIG. 6 below to a concrete operation flow when an access request to a storage system involves extents having different states. FIG. 6 schematically shows a flowchart of a method 600 for managing an access request to an extent on the basis of the state of the extent according to one implementation of the present disclosure. In block 610, an access request to an operating system is received. The access request may be a reading request or a writing request. Next in block 620, the state of an extent involved in the access request is determined. For the sake of description, description is first presented to the situation where the access request involves only one extent.

In block 630, the state of an extent involved in the access request is judged. If the state is "copied," then the operation flow proceeds to block 640. In block 640, the access request may be directed to the destination device 320. At this point, since an extent where target data of the access request is located has been copied from the source device 310 to the destination device 320, data in the destination device 320 is already the latest data, and there is no need to care about data in a corresponding extent in the source device 310. In block 640 data in a corresponding extent in the destination device 320 is processed using the access request. At this point, if the access request is a reading request, then read operation is performed to the corresponding extent in the destination device 320. If the access request is a writing request, write operation is performed to the corresponding extent in the destination device 320.

In block 630, the state of an extent involved in the access request is judged. If the state is "not copied," then the operation flow proceeds to block 642. In block 642, the access request may be directed to the source device 310. At this point, since an extent where target data of the access request is located has not been copied from the source device 310 to the destination device 320, data in the source device 310 is already the latest data. Therefore, in block 642 data in a corresponding extent in the source device 310 is processed using the access request. At this point, if the access request is a reading request, then read operation is performed to the corresponding extent in the source device 310. If the access request is a writing request, write operation is performed to the corresponding extent in the source device 310.

In block 630, the state of an extent involved in the access request is judged. If the state is "being copied," then the operation flow proceeds to block 644. At this point, since an extent where target data of the access request locates is being copied from the source device 310 to the destination device 320, data in the source device 310 is the latest data. Since the access request may be a reading request or a writing request, the type of the access request needs to be judged (as shown in block 644), and further processing is performed according to the type of the access request.

According to one implementation of the present disclosure, in response to the type of the access request being a reading request, the reading request is directed to the source device 310; and in response to the type of the access request being a writing request, the writing request is directed to the source device 310 and the destination device 320. Continuing the method shown in FIG. 6, in block 646, if the access request is a reading request, read operation is performed to a corresponding extent in source device 310. If the access request is a reading request, then write operation needs to be performed to a corresponding extent in the source device 310 and the destination device 320 respectively. In this way, after copy of the extent is completed, data in the destination device 320 is the latest data.

It will be appreciated that only the situation where the access request involves one extent has been described in detail with reference to FIG. 6. In some cases, the access request may cross two and even more extents according to the size the data amount involved in the access request and the size of extents. According to one implementation of the present disclosure, in response to the access request crossing at least two extents among the plurality of extents, the access request is split into at least two sub-requests; and the at least two sub-requests are managed separately on the basis of states of at least two extents associated with the at least two sub-requests.

Specifically, the access request crosses for example two extents, at which point the access request may be split into two sub-requests and the method described with reference to FIG. 6 is executed with respect to each sub-request. If the access request crosses three extents, at this point the access request may be split into three sub-requests, and the method described with reference to FIG. 6 is executed with respect to each sub-request.

According to one implementation of the present disclosure, the size of an extent may further be determined according to the size of data amount involved in an access request received by the storage system. In this way, it may be avoided that an extent is divided into too small extents and thus one access request crosses too many extents.

Figure 7A:
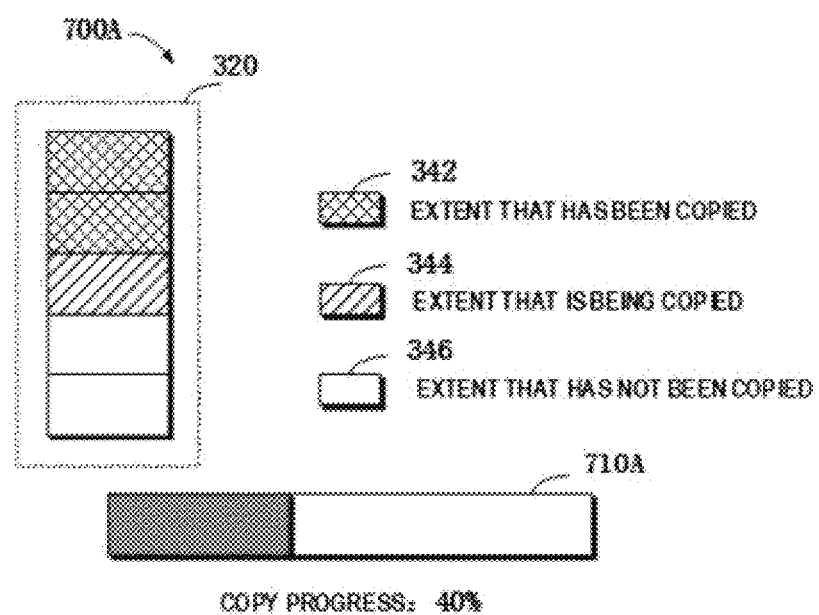
FIGS. 7A and 7B each schematically illustrates a block diagram for displaying copy progress on the basis of the number of extents that have been copied according to one implementation of the present disclosure.
Figure 7B:
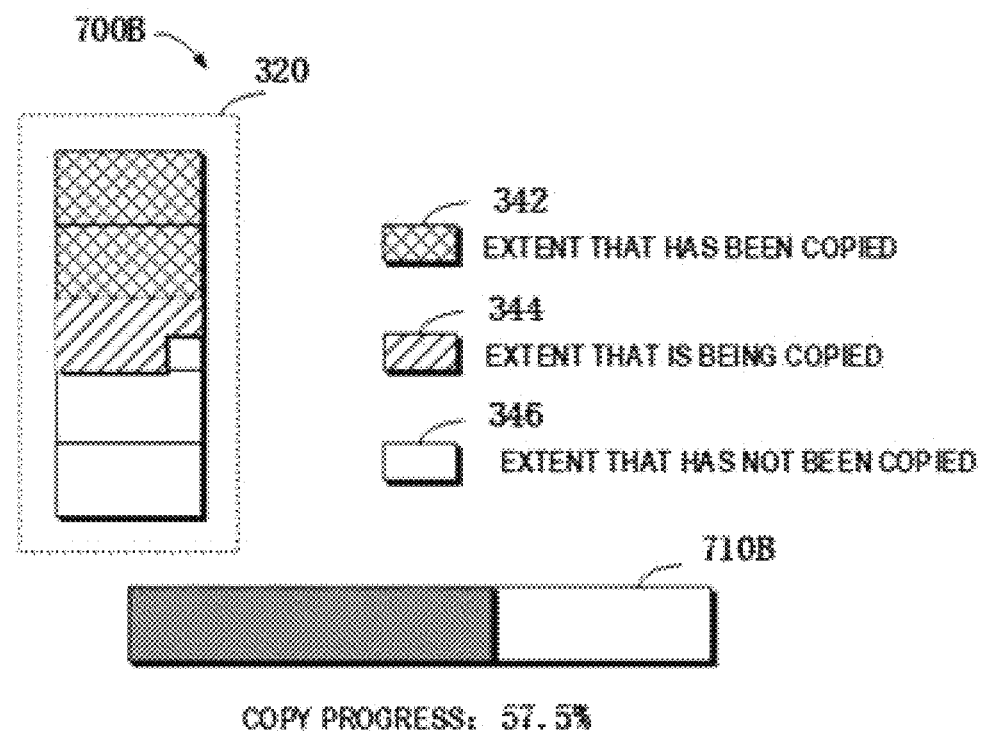

According to one implementation of the present disclosure, an indicator indicative of copy progress may further be set on the basis whether data in an extent among the plurality of extents has been copied to the destination device. With reference to FIGS. 7A and 7B, detailed description is presented below. FIG. 7A schematically shows a block diagram 700A of displaying copy progress on the basis of the number of extents that have been copied according to one implementation of the present disclosure. As depicted, suppose the destination device 320 comprises 5 extents, among which the first two extents are in "copied" state, the third extent is in "being copied" state, and the fourth and fifth extents are in "not copied" state. At this point, the copy progress may be determined on the basis of the proportion of the number of copied extents to the total number of extents. That is, copy progress 710A may be denoted as ⅖=40%.

FIG. 7B schematically shows a block diagram 700B of displaying copy progress on the basis of the number of extents that have been copied according to one implementation of the present disclosure. As depicted, suppose the destination device 320 comprises 5 extents, among which the first two extents are in "copied" state, the third extent is in "being copied" state, and the fourth and fifth extents are in "not copied" state. Since copy of the third extent is not yet completed, and only one part of data has been copied to the destination device 320. At this point, the proportion of the part that has been copied in the extent whose state is "being copied" may further be determined so as to be used for determining the copy progress together with copied extents. Suppose ⅞ data in the third extent has been copied, at this point copy progress 710B may be denoted as (2+⅞)/5=57.5%. By means of the approach as shown in FIG. 7B, the copy progress may be denoted with finer granularity.

According to one implementation of the present disclosure, the copy progress may be stored using different digital lengths. For example, the copy progress may be stored in 64-bit length. For another example, the copy progress may further be stored in other length, 32 bits or 128 bits for example.

Figure 8A:
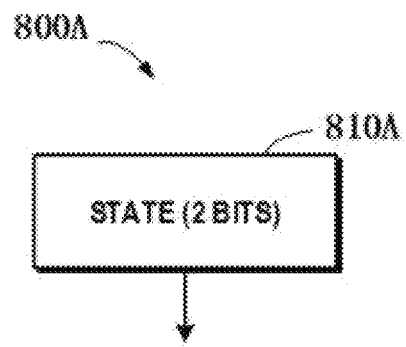
FIGS. 8A and 8B each schematically illustrates a block diagram of a data structure for storing states according to one implementation of the present disclosure.
Figure 8B:
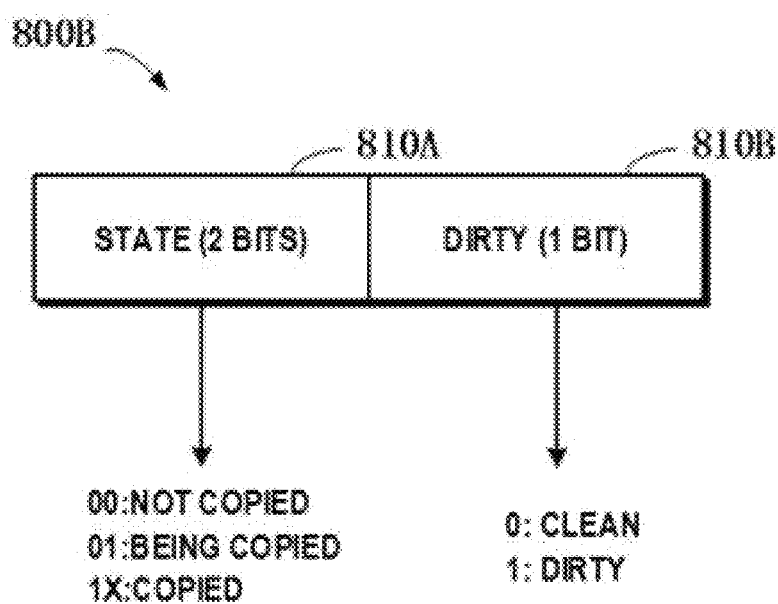

FIG. 8A schematically shows a block diagram 800A of a data structure for storing states according to one implementation of the present disclosure. As depicted, a state may be stored using two bits. For example, 00 may denote "not copied" state, 01 may denote "being copied" state, 10 and 11 (collectively referred to as 1X, i.e. no matter whether the second bit is 0 or 1) may denote "copied" state. According to one implementation of the present disclosure, other definition may further be used to denote various states. For example, 00 may denote "being copied" state, 01 may denote "not copied" state, and 1X may denote "copied" state.

According to one implementation of the present disclosure, the state may further have other length. For example, 16 bits or other length may be used to store states, and bits that are not used in the state may be used as reserved bits so as to be extended for other function.

Description has been presented to the technical solution for processing an access request on the basis of states of different extents so as to perform proactive copy without interrupting the access request. It will be appreciated abnormality might occur during proactive copy. For example, the destination device might fail, at this point the entire storage system will be in degraded state and rebuild operation needs to be performed to the storage system so as to guarantee the normal operation of the storage system.

According to one implementation of the present disclosure, in response to data in the storage system being modified, an extent associated with the modified data in the destination device 320 is marked (e.g. the extent is identified as "dirty"). Subsequently, when the destination device 320 fails, data in the marked extent in the destination device 320 may be recovered on the basis of data in a normal device in the storage system.

Here the identifier "dirty" is special information describing the state of an extent. Therefore, a separate digit 810B (e.g. 1 bit) may be set in the state to identify whether data in the extent is modified. If the digit 810B is set to 0, it means the extent is not modified; if the digit 810B is set to 1, it means the extent is modified and at this point data in the extent is "dirty" data.

According to one implementation of the present disclosure, data in each extent among the plurality of extents may be copied to the destination device one by one. At this point, copy may be performed in order of the plurality of extents. Alternatively or additionally, the plurality of extents in the source device 310 may be sorted in order to priority, and an extent having higher priority will be first copied.

According to one implementation of the present disclosure, in response to data in all of the plurality of extents having been copied to the destination device, the source device is replaced with the destination device. It will be appreciated when all extents have been copied, all data in the end-of-life source device 310 has been copied to the normal destination device 320. At this point, the end-of-life source device 310 in the storage system may be replaced with the normal destination device 320 so as to maintain the normal operation of the storage system.

According to one implementation of the present disclosure, if there are a plurality of storage devices being faced with end-of-life in the storage system, the method described above may be performed to each storage device one after another.

Various implementations implementing the method of the present invention have been described above with reference to the accompanying drawings. Those skilled in the art may understand the method may be implemented in software, hardware or a combination of software and hardware. Moreover, those skilled in the art may understand by implementing various steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various implementations of the present invention. The apparatus described in the present invention comprises several means or modules, which are configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As a detailed and complete description has been presented above, it might be ignored below.

Figure 9:
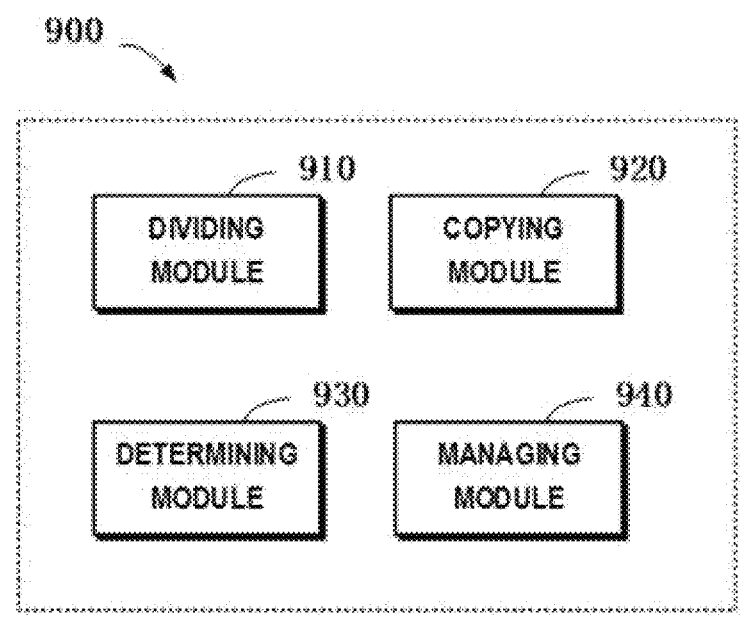
FIG. 9 schematically illustrates a block diagram of an apparatus for managing a storage system according to one implementation of the present disclosure.

FIG. 9 schematically shows a block diagram of an apparatus 900 for managing a storage system according to one implementation of the present disclosure. The apparatus 900 comprises: a dividing module 910 configured to divide a source device among a plurality of storage devices in the storage system into a plurality of extents; a copying module 920 configured to copy data in the plurality of extents to a destination device; a determining module 930 configured to determine the state of an extent among the plurality of extents on the basis whether data in the extent among the plurality of extents has been copied to the destination device; and a managing module 940 configured to manage an access request to the extent on the basis of the state of the extent.

According to one implementation of the present disclosure, the managing module 940 is further configured to direct the access request to the destination device in response to the state indicating that data in the extent among the plurality of extents has been copied to the destination device.

According to one implementation of the present disclosure, the managing module 940 is further configured to direct the access request to the source device in response to the state indicating that data in the extent has not been copied to the destination device.

According to one implementation of the present disclosure, the managing module 940 is further configured to: in response to the state indicating that data in the extent is being copied to the destination device, determine the type of the access request; and manage the access request on the basis of the type.

According to one implementation of the present disclosure, the managing module 940 is further configured to: in response to the type of the access request being a reading request, direct the reading request to the source device; and in response to the type of the access request being a reading request, direct the reading request to both the source device and the destination device.

According to one implementation of the present disclosure, the managing module 940 is further configured to: in response to data in the storage system being modified, mark an extent associated with the modified data in the destination device; and in response to the destination device failing, recover data in the marked extent in the destination device on the basis of data in a normal device in the storage system.

According to one implementation of the present disclosure, the managing module 940 is further configured to: in response to the access request crossing at least two extents among the plurality of extents, split the access request into at least two sub-requests; and manage the at least two sub-requests separately on the basis of states of at least two extents associated with the at least two sub-requests.

According to one implementation of the present disclosure, the managing module 940 is further configured to: set an indicator indicative of copy progress on the basis whether data in extents among in the plurality of extents has been copied to the destination device.

According to one implementation of the present disclosure, the managing module 940 is further configured to: copy data in all extents among the plurality of extents to the destination device one by one.

According to one implementation of the present disclosure, the managing module 940 is further configured to: replace the source device with the destination device in response to data in all of the plurality of extents having been copied to the destination device.

According to one implementation of the present disclosure, there is provided a system for managing a storage system, comprising: one or more processors; a memory coupled to at least one processor of the one or more processors; computer program instructions stored in the memory which, when executed by the at least one processor, cause the system to execute a method for managing a storage system. The method comprises: dividing a source device among a plurality of storage devices in the storage system into a plurality of extents; copying data in the plurality of extents to a destination device; determining the state of an extent among the plurality of extents on the basis whether data in the extent among the plurality of extents has been copied to the destination device; and managing an access request to the extent on the basis of the state of the extent.

According to one implementation of the present disclosure, the managing an access request to the extent on the basis of the state of the extent comprises: directing the access request to the destination device in response to the state indicating that data in the extent among the plurality of extents has been copied to the destination device.

According to one implementation of the present disclosure, the managing an access request to the extent on the basis of the state of the extent comprises: directing the access request to the source device in response to the state indicating that data in the extent has not been copied to the destination device.

According to one implementation of the present disclosure, the managing an access request to the extent on the basis of the state of the extent comprises: in response to the state indicating that data in the extent is being copied to the destination device, determining the type of the access request; and managing the access request on the basis of the type.

According to one implementation of the present disclosure, the managing an access request to the extent on the basis of the state of the extent comprises: in response to the type of the access request being a reading request, directing the reading request to the source device; and in response to the type of the access request being a reading request, directing the reading request to both the source device and the destination device.

According to one implementation of the present disclosure, the method further comprises: in response to data in the storage system being modified, marking an extent associated with the modified data in the destination device; and in response to the destination device failing, recovering data in the marked extent in the destination device on the basis of data in a normal device in the storage system.

According to one implementation of the present disclosure, the method further comprises: in response to the access request crossing at least two extents among the plurality of extents, splitting the access request into at least two sub-requests; and managing the at least two sub-requests separately on the basis of states of at least two extents associated with the at least two sub-requests.

According to one implementation of the present disclosure, the method further comprises: setting an indicator indicative of copy progress on the basis whether data in extents among in the plurality of extents has been copied to the destination device.

According to one implementation of the present disclosure, the copying data in the plurality of extents to the destination device comprises: copying data in all extents among the plurality of extents to the destination device one by one.

According to one implementation of the present disclosure, the method further comprises: replacing the source device with the destination device in response to data in all of the plurality of extents having been copied to the destination device.

In one implementation of the present disclosure, there is provided a computer program product tangibly stored on a non-transient computer readable medium and comprising machine executable instructions which, when executed, cause the machine to execute a method for managing a storage system. The method comprises: dividing a source device among a plurality of storage devices in the storage system into a plurality of extents; copying data in the plurality of extents to a destination device; determining the state of an extent among the plurality of extents on the basis whether data in the extent among the plurality of extents has been copied to the destination device; and managing an access request to the extent on the basis of the state of the extent.

According to one implementation of the present disclosure, the managing an access request to the extent on the basis of the state of the extent comprises: directing the access request to the destination device in response to the state indicating that data in the extent among the plurality of extents has been copied to the destination device.

According to one implementation of the present disclosure, the managing an access request to the extent on the basis of the state of the extent comprises: directing the access request to the source device in response to the state indicating that data in the extent has not been copied to the destination device.

According to one implementation of the present disclosure, the managing an access request to the extent on the basis of the state of the extent comprises: in response to the state indicating that data in the extent is being copied to the destination device, determining the type of the access request; and managing the access request on the basis of the type.

According to one implementation of the present disclosure, the managing an access request to the extent on the basis of the state of the extent comprises: in response to the type of the access request being a reading request, directing the reading request to the source device; and in response to the type of the access request being a reading request, directing the reading request to both the source device and the destination device.

According to one implementation of the present disclosure, the method further comprises: in response to data in the storage system being modified, marking an extent associated with the modified data in the destination device; and in response to the destination device failing, recovering data in the marked extent in the destination device on the basis of data in a normal device in the storage system.

According to one implementation of the present disclosure, the method further comprises: in response to the access request crossing at least two extents among the plurality of extents, splitting the access request into at least two sub-requests; and managing the at least two sub-requests separately on the basis of states of at least two extents associated with the at least two sub-requests.

According to one implementation of the present disclosure, the method further comprises: setting an indicator indicative of copy progress on the basis whether data in extents among in the plurality of extents has been copied to the destination device.

According to one implementation of the present disclosure, the copying data in the plurality of extents to the destination device comprises: copying data in all extents among the plurality of extents to the destination device one by one.

According to one implementation of the present disclosure, the method further comprises: replacing the source device with the destination device in response to data in all of the plurality of extents having been copied to the destination device.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

The invention claimed is:

1. A method for managing a storage system, the method comprising:
dividing a source storage device of a plurality of persistent storage devices in the storage system into a plurality of extents, the plurality of persistent storage devices including a group of persistent storage devices arranged in a Redundant Array of Independent Drives (RAID) configuration, the group including the source storage device;
in response to the source storage device reaching an end-of-life condition while the source storage device continues to operate, proactively copying data in the plurality of extents to a destination storage device of the plurality of persistent storage devices;
while continuing to copy the data in the plurality of extents, determining a copy status of an extent among the plurality of extents on the basis of whether all data in that extent has yet been copied to the destination storage device;
selectively fulfilling an access request to that extent using one of the source storage device and the destination storage device on the basis of the copy status of that extent; and
in response to data in all of the plurality of extents having been copied to the destination storage device:
removing the source storage device from the group arranged in the RAID configuration; and
adding the destination storage device to the group arranged in the RAID configuration in place of the removed source storage device.

2. The method according to claim 1, wherein the selectively fulfilling the access request to that extent on the basis of the copy status of that extent comprises:
directing the access request to the destination storage device in response to the copy status indicating that all data in that extent has been copied to the destination storage device.

3. The method according to claim 1, wherein the selectively fulfilling the access request to that extent on the basis of the copy status of that extent comprises:
directing the access request to the source storage device in response to the copy status indicating that not all data in that extent has yet been copied to the destination storage device.

4. The method according to claim 1, wherein the selectively fulfilling the access request to that extent on the basis of the copy status of that extent comprises: in response to the copy status indicating that data in the extent is currently being copied to the destination storage device,
determining a type of the access request; and
selectively fulfilling the access request on the basis of the type.

5. The method according to claim 4, wherein the selectively fulfilling the access request to that extent on the basis of the copy status of that extent further comprises:

in response to the type of the access request being a reading request, directing the reading request to the source storage device; and in response to the type of the access request being a writing request, directing the writing request to both the source storage device and the destination storage device.

6. The method according to claim 1, further comprising:
in response to data in the storage system being modified, marking an extent associated with the modified data in the destination storage device; and
in response to the destination storage device failing, recovering data in the marked extent in the destination storage device on the basis of data in a normal device in the storage system.

7. The method according to claim 1, further comprising:
in response to the access request crossing at least two extents among the plurality of extents, splitting the access request into at least two sub-requests; and
selectively fulfilling the at least two sub-requests separately on the basis of copy statuses of at least two extents associated with the at least two sub-requests.

8. The method according to claim 1, further comprising:
setting an indicator indicative of copy progress on the basis of whether data in extents among the plurality of extents has been copied to the destination storage device.

9. The method according to claim 1, wherein the copying data in the plurality of extents to the destination storage device comprises:
copying data in all extents among the plurality of extents to the destination storage device one by one.

10. A system for managing a storage system, comprising:
one or more processors;
a memory coupled to at least one processor of the one or more processors; and
computer program instructions stored in the memory which, when executed by the at least one processor, cause the system to execute a method for managing a storage system, the method comprising:
dividing a source storage device among a plurality of persistent storage devices in the storage system into a plurality of extents, the plurality of persistent storage devices includes a group of persistent storage devices arranged in a Redundant Array of Independent Drives (RAID) configuration, the group including the source storage device;
in response to the source storage device reaching an end-of-life condition while the source storage device continues to operate, proactively copying data in the plurality of extents to a destination storage device of the plurality of persistent storage devices;
while continuing to copy the data in the plurality of extents, determining a copy status of an extent among the plurality of extents on the basis whether all data in that extent has yet been copied to the destination storage device;
selectively fulfilling an access request to that extent using one of the source storage device and the destination storage device on the basis of the copy status of that extent; and
in response to data in all of the plurality of extents having been copied to the destination storage device:
removing the source storage device from the group arranged in the RAID configuration; and
adding the destination storage device to the group arranged in the RAID configuration in place of the removed source storage device.

11. The system according to claim 10, wherein the selectively fulfilling the access request to that extent on the basis of the copy status of that extent comprises: directing the access request to the destination device in response to the copy status indicating that all data in that extent has been copied to the destination storage device.

12. The system according to claim 10, wherein the selectively fulfilling the access request to that extent on the basis of the copy status of that extent comprises:
directing the access request to the source storage device in response to the copy status indicating that not all data in the extent has yet been copied to the destination storage device.

13. The system according to claim 10, wherein the selectively fulfilling the access request to that extent on the basis of the copy status of that extent comprises: in response to the copy status indicating that data in the extent is currently being copied to the destination storage device,
determining a type of the access request; and
selectively fulfilling the access request on the basis of the type.

14. The system according to claim 13, wherein the selectively fulfilling the access request to that extent on the basis of the copy status of that extent further comprises:
in response to the type of the access request being a reading request, directing the reading request to the source storage device; and
in response to the type of the access request being a writing request, directing the writing request to both the source storage device and the destination storage device.

15. The system according to claim 10, wherein the method further comprises:
in response to data in the storage system being modified, marking an extent associated with the modified data in the destination storage device; and
in response to the destination storage device failing, recovering data in the marked extent in the destination storage device on the basis of data in a normal device in the storage system.

16. The system according to claim 10, wherein the method further comprises:
in response to the access request crossing at least two extents among the plurality of extents, splitting the access request into at least two sub-requests; and
selectively fulfilling the at least two sub-requests separately on the basis of copy statuses of at least two extents associated with the at least two sub-requests.

17. The system according to claim 10, wherein the method further comprises:
setting an indicator indicative of copy progress on the basis whether data in extents among the plurality of extents has been copied to the destination storage device.

18. The system according to claim 10, wherein the copying data in the plurality of extents to the destination storage device comprises:
copying data in all extents among the plurality of extents to the destination storage device one by one.

* * * * *